United States Patent [19]

Harris et al.

[11] Patent Number: 5,157,006
[45] Date of Patent: Oct. 20, 1992

[54] ADDITIVE AND PROCESS FOR VANADIUM CAPTURE IN CATALYTIC CRACKING

[75] Inventors: Jesse R. Harris, Bartlesville, Okla.; Ping C. Liao, Houston, Tex.

[73] Assignee: Phillips Petroleum Company, Bartlesville, Okla.

[21] Appl. No.: 666,813

[22] Filed: Mar. 8, 1991

[51] Int. Cl.$^5$ .......................... B01J 29/06; B01J 33/00
[52] U.S. Cl. ......................................... 502/62; 502/64; 502/65; 502/156; 502/521
[58] Field of Search .................. 502/521, 62, 64, 65, 502/156; 208/91, 253

[56] References Cited

U.S. PATENT DOCUMENTS

| | | | |
|---|---|---|---|
| 2,902,442 | 9/1959 | Erdman et al. | 208/253 |
| 3,274,279 | 9/1966 | Pollitzer | 208/253 |
| 4,087,349 | 5/1978 | Baird, Jr. | 208/253 |
| 4,158,621 | 6/1979 | Swift et al. | 208/114 |
| 4,414,098 | 11/1983 | Zandona et al. | 208/91 |
| 4,743,358 | 5/1988 | Kugler et al. | 502/521 |
| 4,781,816 | 11/1988 | Lee et al. | 208/120 |
| 4,889,615 | 12/1989 | Chin et al. | 208/113 |

FOREIGN PATENT DOCUMENTS 2138314A  10/1984  United Kingdom .

OTHER PUBLICATIONS

Wormsbecker, R. F., et al. "Vanadium Poisoning of Cracking Catalysts: Mechanism of Poisoning and Design of Vanadium Tolerant Catalyst System", Journal of Catalysis 100, 1986, pp. 130-137.

Primary Examiner—Carl F. Dees
Attorney, Agent, or Firm—Ryan N. Cross

[57] ABSTRACT

A catalytic cracking composition comprising a physical blend of a cracking catalyst component with alcohol treated $Sr(OH)_2$ and alcohol is used to crack hydrocarbon-containing feedstocks that further contain quantities of vanadium.

26 Claims, No Drawings

ADDITIVE AND PROCESS FOR VANADIUM CAPTURE IN CATALYTIC CRACKING

This invention relates generally to the catalytic cracking of hydrocarbon-containing feedstocks.

The increasing necessity faced by the refining industry for processing heavier feedstocks containing higher concentrations of metal contaminants presents a number of problems caused by the harmful effects of these contaminants. The most common metal contaminants are nickel and vanadium which are generally present in the form of porphyrins or asphaltenes and during the cracking process they are deposited on the catalyst together with the coke formed during the cracking operation. Because both these metals exhibit dehydrogenation activity, their presence on the catalyst particles tends to promote dehydrogenation reactions during the cracking sequence and this results in increased amounts of coke and light gases at the expense of gasoline production. It has been shown that increased coke and hydrogen formation is due primarily to nickel deposited on the catalyst whereas vanadium also causes zeolite degradation and activity loss as reported in *Oil and Gas Journal*, Apr. 9, 1984, 102–111. The mechanism of vanadium poisoning of cracking catalysts is described in the article by Wormsbecker et al in *J. Catalysis* 100, 130–137 (1986). Essentially, the vanadium compounds present in the feed become incorporated in the coke, which is deposited on the cracking catalyst, and then in the regenerator is oxidized to vanadium pentoxide as the coke is burned off. The vanadium pentoxide is then posited to react with water vapor present in the regenerator to form vanadic acid which is capable of reacting with the zeolite catalyst, destroying its crystallinity and reducing its activity.

Because the compounds of vanadium and other metals cannot, in general, be readily removed from the cracking unit as volatile compounds, the usual approach has been to passivate them or render them innocuous under the conditions which are encountered during the cracking process. One passivation method has been to incorporate additives into the cracking catalyst or separate particles which combine with the metals and therefore act as "traps" or "sinks" so that the active zeolite component is protected. The metal contaminants are removed altogether with the catalyst withdrawn from the system during its normal operation and fresh metal trap is added together with makeup catalyst so as to effect a continuous withdrawal of the deleterious metal contaminants during operation. Depending upon the level of the harmful metals in the feed to the unit, the amount of additive may be varied relative to the makeup catalyst in order to achieve the desired degree of metals passivation. Additives proposed for controlling vanadium include the alkaline earth metal oxides, especially magnesium oxide and calcium oxide (Wormsbecker, op cit) as well as strontium oxide as described in U.S. Pat. No. 4,781,816. These materials, which are typically in the oxide form at the temperatures encountered in the regenerator, presumably exhibit a high reaction rate with vanadium to yield a stable complex vanadate species which effectively binds the vanadium and prevents degradation of the active cracking component in the catalyst.

It is an object of this invention to provide a catalytic cracking composition which exhibits superior vanadium passivating capacity and thus increases the efficiency of the catalytic cracking of vanadium contaminated hydrocarbon-containing feedstock.

It is another object of the invention to provide a catalytic cracking composition and a process for using the catalytic cracking composition which reduce the hydrogen gas yield and increase the gasoline yield produced by the catalytic cracking of vanadium contaminated hydrocarbon-containing feedstocks.

It is a further objective of this invention to provide a catalytic cracking composition and a process for utilizing the catalytic cracking composition for the catalytic cracking of vanadium contaminated heavy hydrocarbon-containing feedstocks which will increase the conversion of the vanadium contaminated heavy hydrocarbon-containing feedstocks to lighter hydrocarbon-containing products.

It is still a further object of this invention to provide a process for preparing a passivation additive which exhibits superior passivating capacity and increases the conversion of vanadium contaminated hydrocarbon-containing feedstocks to lighter hydrocarbon-containing products. Other objects and advantages will become apparent from the detailed description in the appended claims.

In accordance with this invention, there is provided a catalytic cracking composition comprising a physical blend of a cracking catalyst component and alcohol treated $Sr(OH)_2$.

In another aspect of the invention, there is provided a process for preparing a passivation additive comprising mixing $Sr(OH)_2$ with an alcohol to form an alcohol mixture, and calcining the thus formed alcohol mixture to form a calcined mixture.

In a further aspect of the invention, there is provided a catalytic cracking process comprising contacting a hydrocarbon-containing feed stream with a catalytic cracking composition comprising a physical blend of (a) a cracking catalyst component and (b) alcohol treated $Sr(OH)_2$, in a cracking zone under such cracking conditions as to obtain at least one liquid hydrocarbon-containing product stream having a lower initial boiling point and a higher $API^{60}$ gravity than the hydrocarbon-containing feed stream.

Preferably, the cracking process of this invention comprises the additional steps of removing the catalytic cracking composition from the cracking zone after it has been used in the cracking zone; separating the thus removed catalytic cracking composition from gases and the at least one liquid product stream; exposing at least a portion of the thus separated catalytic cracking composition to flowing steam (for the stripping of adhered liquids from the catalytic cracking composition); and heating the thus steam stripped catalytic cracking composition with an oxygen-containing gas so as to substantially remove coke deposits from the catalytic cracking composition, substantially convert vanadium compounds deposited thereon to vanadium oxide and thus produce a regenerated catalytic cracking composition. More preferably, the cracking process of this invention comprises the additional steps of recycling at least a portion of the regenerated catalytic cracking composition (to which more preferably fresh, unused catalytic cracking composition is added so as to provide an equilibrium catalyst) to said cracking zone.

The present invention is preferably employed with catalytic cracking operations in which a high boiling point petroleum feed is catalytically cracked to products of relatively lower boiling point, particularly gasoline. As used in this disclosure and the claims, "cracking catalyst component" refers to a composition suitable for catalytically cracking high-boiling point petroleum feed into products of relatively low-boiling point, particularly gasoline. The cracking catalyst component comprises at least in part at least one cracking catalyst.

The cracking catalysts which are suitable for use include solid materials having acidic functionality upon which the cracking reactions take place. The pore size of the solids is sufficient to accommodate the molecules of the feed so that cracking can take place on the interior surfaces of the porous catalyst and so that the cracking fragments can leave the catalyst. Current catalytic cracking processes employ zeolite cracking catalysts. If a zeolite is used in the present invention, it can be any natural or synthetic crystalline aluminosilicate zeolite which exhibits cracking activity. Non-limiting examples of such zeolites are faujasite, chabazite, mordenite, offretite, erionite, zeolite X, zeolite Y, zeolite L, zeolite ZSM, and the like, and mixtures thereof. Additional examples of suitable zeolites are listed in U.S. Pat. No. 4,158,621, the disclosure of which is herein incorporated by reference. It is within the scope of this invention to use zeolites from which a portion of Al has been removed from the crystalline framework, and/or which have been ion-exchanged with rare earth metal or ammonium or by other conventional ion-exchange methods. Preferably, a synthetic faujasite of the Y-type (zeolite Y), more preferably a rare earth-exchanged zeolite Y (REY zeolite), is employed as a cracking catalyst.

Conventionally, the zeolite will be distributed through a porous inorganic refractory matrix material to provide superior mechanical strength and attrition resistance to the zeolite. The inorganic refractory matrix material in which the zeolite is embedded can be any suitable amorphos or crystalline refractory material, such as silica, alumina, silica-alumina, aluminosilicates (e.g., clays), aluminum phosphate, and the like, and mixtures of any two or more thereof.

The zeolite can be embedded in the inorganic refractory matrix material in any suitable manner so as to prepare cracking catalyst component (a). Preferably, a slurry of the zeolite in a liquid (more preferably in water) and a slurry of the matrix material in a liquid (more preferably water) are mixed; the thus obtained dispersed zeolite/matrix mixture is separated by any suitable method (more preferably by filtration) from the liquid portion of the slurry mixture; the separated intimate zeolite/matrix mixture is at least partially dried (more preferably at about 100°-200° C.) and then calcined (more preferably by heating in air, at about 600°-900° C. for about 1-5 hours). The zeolite/matrix mixture can be ground and sieved during any phase of the preparation (preferably after drying) so as to obtain a material having a desired particle size range. The material can also be exposed to steam, e.g., at about 700°-1500° F. (about 370° to about 820° C.).

The zeolite/matrix mixture, i.e., the calcined intimate mixture of zeolite and matrix material (i.e. zeolite embedded in the inorganic refractory matrix material) generally has a BET/$N_2$ surface area (ASTM D3037) in the range of from about 50 to about 800 m$^2$/g, preferably from about 100 to about 400 m$^2$/g. Generally, the weight ratio of zeolite to the matrix material is in the range of from about 1:30 to about 1:1, preferably from about 1:15 to about 1:3. A non-limiting example of a suitable commercial zeolite/matrix cracking catalyst composition is GXO-40, described in Example I.

The alcohol treated Sr(OH)$_2$ passivation additive, component (b) of the cracking catalyst composition, can be prepared by any suitable means. Preferably, enough alcohol is mixed with Sr(OH)$_2$ to form a paste, typically from about 0.1 cc/gr to about 1 cc/gr of Sr(OH)$_2$, and afterwards the resulting mixture is calcined. The mixture should be calcined at a temperature near or above the melting point of the Sr(OH)$_2$. Generally, a temperature in the range of 200° C. to about 600° C., preferably in the range of 400° C. to 600° C. The alcohol used in the passivation additive can be any alcohol but is preferably an alcohol with from 2 to 10 carbon atoms. Non-limiting examples of such alcohols are octyl alcohol and butyl alcohol. Although it is within the scope of this invention to add the passivation additive to the hydrocarbon-containing feed stream, it is preferred that the passivation additive be blended with component (a), the cracking catalyst component. Cracking catalyst components (a) and (b) can be blended by any suitable method such as dry blending (presently preferred) in a suitable mechanical mixing/blending device. Generally enough, component (b) is blended with component (a) to effectively passivate vanadium that is present in the hydrocarbon-containing feed. Typically, component (b) will make up from 1 weight percent to 25 weight percent of the resulting catalytic cracking composition based on the total weight of the catalytic cracking composition.

Other cracking catalyst additives can also be present. They can be distributed on the particles of the active cracking catalyst component or, alternatively, on separate catalyst particles or on a separate inert support. They can also be added to the hydrocarbon-containing feed stream. Additives of this kind can include CO combustion promoters, metals which have been stated to have a desirable effect on the reduction of nitrogen, or rhodium and other metal passivation additives, such as antimony to control nickel poisoning. Such additives and systems can be used in conjunction with the catalytic cracking composition of the present invention with the additional additives distributed on the particles of the cracking catalyst component, e.g., on the matrixed particles of zeolite Y, on separate inert support, or added with the hydrocarbon-containing feed stream.

This invention is applicable to any catalytic cracking composition having vanadium oxide present on the composition. It is particularly applicable where the catalytic cracking composition comprises a regenerated catalytic cracking composition (defined below) that has been used in a process for cracking vanadium-containing heavy oils. When such heavy oils are catalytically cracked, vanadium compounds from the feed are deposited on the catalyst, and these deposits are substantially converted to vanadium oxide during oxidative regeneration.

The conditions generally employed in catalytic cracking are well established and may generally be characterized as being of elevated temperature appropriate to an endothermic cracking process with a relatively short contact time between the catalyst and the cracking feed. Specific operating conditions of the cracking operation depend greatly on the type of feed, the type and dimensions of the cracking reactor and the oil feed rate.

In fluidized-bed catalytic cracking (FCC) operation, cracking is generally carried out at temperatures in the range of from about 800° F. to about 1200° F. (about 420° C. to about 650° C.), more usually from about 900°

F. to about 1050° F. (about 480° C. to about 565° C.), under moderate superatmospheric pressure, typically up to about 100 psia (about 700 kPa), frequently up to about 60 psia (about 415 kPa), with catalyst:oil weight ratios in the range of from about 1:2 to about 25:1, typically 2:1 to 10:1. Generally steam is added with the oil feed to the FCC reactor so as to aid in the dispersion of oil as droplets. Generally the weight ratio of steam to oil feed is in the range of from about 0.01:1 to about 0.5:1. Hydrogen gas can also be added to the cracking reactor; but presently $H_2$ addition is not a preferred feature of this invention, thus added hydrogen gas should preferably be substantially absent from the cracking zone. These conditions will, however, vary according to the feedstock, the character of the catalyst and the desired cracking products slate. During operation, the catalyst typically passes cyclically from a cracking zone to a regeneration zone where the coke deposited on the catalyst during the cracking reaction is oxidatively removed by contacting the spent catalyst with a current of oxygen-containing gas so that the coke burns off the catalyst to provide hot regenerated catalytic cracking composition which then passes back to the cracking zone where it is contacted with fresh hydrocarbon-containing feed together with any recycle for a further cracking cycle.

The hydrocarbon-containing feed stream, with which the cracking process of this invention can be advantageously employed can be any feedstock containing sufficient vanadium to interfere with catalyst efficiency and having an initial boiling point (ASTM D 1160) in excess of about 400° F. (about 200° C.), preferably boiling in the range of from about 400° F. to about 1300° F. (about 200° C. to about 710° C.), more preferably boiling in the range of from about 600° F. to about 1200° F. (about 310° F. to about 650° C.), all measured at about atmospheric pressure conditions (above 0 psig=1 atm).

Non-limiting examples of suitable feedstocks are topped crudes (residua), distillation bottom fractions, heavy gas oils, heavy cycle oils, slurry oils (decant oils), hydrotreated residua (i.e., having been hydrotreated in the presence of a promoted hydrotreating catalyst, preferably a Ni, Co, Mo-promoted alumina catalyst), heavy liquid coal pyrolyzates, heavy liquid products from extraction of coal, heavy liquid products from liquefaction of coal, heavy liquid products from tar sand, shale oils, heavy fractions of shale oils, and the like. Presently, most preferred feedstocks are hydrotreated residua.

Any suitable reactor can be used for the catalyst cracking process of this invention. Generally, an FCC reactor or a moving bed catalytic cracking reactor (e.g., a Thermofor catalytic cracker) is employed.

The catalytic cracking composition that has been used in the cracking process (commonly called "spent catalyst") contains deposits of coke and metals or compounds of metals (in particular nickel and vanadium compounds). The spent catalyst is generally removed from the cracking zone and then separated from formed gases and liquid products by any conventional separation means (e.g., in a cyclone), as is described in "Petroleum Refining" by James H. Gary and Glenn E. Handwerk, Marcel Dekker, Inc. 1975, the disclosure of which is herein incorporated by reference.

Adhered liquid oil is generally stripped from the spent catalyst by flowing steam (preferably having a temperature of about 700° F.-1,500° F.). The steam-stripped catalyst is generally heated in a free oxygen-containing gas stream in the regeneration unit of the cracking reactor, as is shown in the above-cited reference, so as to produce a regenerated catalytic cracking composition. Generally, air is used as the free oxygen-containing gas; and the temperature of the catalyst during regeneration with air preferably is about 1100° F.-1400° F. (i.e., about 590° C.-760° C.). Substantially all coke deposits are burned off and metal deposits (in particular vanadium compounds) are at least partially converted to metal oxides during regeneration. Enough fresh, unused cracking catalyst is generally added to the regenerated catalytic cracking composition, so as to provide a so-called equilibrium catalyst of desirably high cracking activity. At least a portion of the regenerated catalytic cracking composition, preferably equilibrium catalyst, is generally recycled to the cracking reactor. Preferably the recycled regenerated catalytic cracking composition, preferably recycled equilibrium catalyst, is transported by means of a suitable lift gas stream (e.g., steam and/or hydrogen and/or gaseous hydrocarbons) to the cracking reactor and introduced to the cracking zone (with or without the lift gas).

The separation of liquid products into various gaseous and liquid product fractions can be carried out by any conventional separation means, generally by fractional distillation. The most desirable product fraction is gasoline (ASTM boiling range: about 180° F.-400° F.). Non-limiting examples of such separation schemes are shown in "Petroleum Refining" by J. H. Gary et. al., cited above.

The following examples are presented to further illustrate the invention and are not to be considered as unduly limiting the scope of this invention.

BASE CATALYST

This example illustrates the preparation of a base cracking catalyst and the performance of this base catalyst in the cracking test. The base catalyst was a commercial REY cracking catalyst GXO-40 (provided by Davison Division of W. R. Grace and Company); surface area: 225 m$^2$/g; pore volume: .32 cc/g; containing about 33.1 wt.-% alumina and about 2.7 wt.-% rare earth oxide. The base catalyst was dried and fine particles blown out by placing the base catalyst in a furnace with air flowing through it at 450° F. The base catalyst was then steam-treated at 1450° F. for 5 hours at 1 atmosphere pressure in a stream of 100% steam before the cracking tests were carried out. This procedure is used to simulate the catalyst at equilibrium. The base catalyst was steamed and catalyst activity was measured in a microconfined bed unit (MCBU) at a cracking temperature of 950° F. with a catalyst:oil weight ratio of 6:1 and a 0.5 minute feed injection time. The gas oil feed used was a hydrotreated California Cat Canyon crude which was topped at 650° F. The API$^{60}$ gravity (measured at 60° F.) of the feed was approximately 22.8. The feed also contained Conradson carbon residue (ASTM D189; about 3.14 weight percent), nickel (approximately 3.62 ppmw) and vanadium (about 1.66 ppm). The results of these tests are given in Runs 1 and 2 in Table 1 below.

BASE CATALYST+V

GXO-40 catalyst was dried and particles blown out as with the Base Catalyst. The resulting base catalyst was impregnated with 5,000 ppm of vanadium using vanadyl naphthenate. The process used was to heat 608 cc of toluene in a 1,000 cc beaker until it was refluxing from the container walls, approximately 1 inch above the liquid. 79 grams of vanadyl napthenate was then dissolved in the toluene. The resulting solution was mixed with 486 grams of the base catalyst. The thus obtained mixture was dried on a hot plate, slowly heated to 644° F. (so as to decompose organic compounds) and then calcined in air at 1250° F. for about 4 to 5 hours. The resulting vanadium impregnated catalyst was steamed and tested as with the Base Catalyst. The results of these tests are given in Runs 3-6 in Table 1 below.

CONTROL

Three samples of vanadium impregnated catalyst obtained from the same method as with the Base Catalyst+V were physically mixed with different amounts of $Sr(OH)_2$ to give a sample containing 1 wt.-% $Sr(OH)_2$, a sample containing 5 wt.-% $Sr(OH)_2$, and a sample containing 20 wt.-% $Sr(OH)_2$. These three $Sr(OH)_2$ containing samples were then each steamed and tested as with the Base Catalyst. The results of these tests are given in Runs 7 and 8, Runs 9-11, and Runs 12 and 13, respectively, in Table 1.

EXAMPLE I 20 grams of $Sr(OH)_2$ was mixed in an evaporating dish with enough octyl alcohol to form a paste. The mixture was heated to 200° C. for 1 hour, then to 400° C. for 1 hour and then to 500° C. for 1½ hours to calcine. The octyl alcohol-treated $Sr(OH)_2$ (hereinafter $Sr(OH)_2$+octyl) was then physically mixed with three samples of vanadium impregnated catalyst obtained from the same method as with the Base Catalyst+V. These three samples contained 1 wt.-% $Sr(OH)_2$+octyl, 5 wt.-% $Sr(OH)_2$+octyl, and 20 wt.-% $Sr(OH)_2$+octyl. Each of these samples containing $Sr(OH)_2$+octyl was then steamed and tested in accordance with the Base Catalyst. The results of these tests are given in Runs 14 and 15, Runs 16-18, and Runs 19 and 20, respectively, in Table 1.

EXAMPLE II $Sr(OH)_2$ was mixed with butyl alcohol and heated using the same procedure as with the Base Catalyst. Enough butyl alcohol treated $Sr(OH)_2$ (hereinafter $Sr(OH)_2$+butyl) was then physically mixed with vanadium impregnated catalyst, obtained from the same method as with the Base Catalyst+V to result in a 5 wt.-% $Sr(OH)_2$+butyl mixture. The mixture was then steamed and tested in accordance with the Base Catalyst. The results of these tests are given in Runs 21 and 22 in Table 1.

TABLE 1

| Run No. | Additive | V Level (ppm) | Conversion (wt. %) | Gasoline Yield (wt. %) | Coke Yield wt. % | $H_2$ (SCFB)* |
|---|---|---|---|---|---|---|
| 1 | None | 0 | 81.8 | 75.3 | 10.2 | 59 |
| 2 | None | 0 | 82.2 | 57.2 | 10.2 | 56 |
| Average of Runs 1 and 2 | | | 82.0 | 66.2 | 10.2 | 58 |
| 3 | None | 5000 | 59.5 | 42.8 | 8.5 | 437 |
| 4 | None | 5000 | 59.8 | 42.6 | 8.7 | 456 |
| 5 | None | 5000 | 58.9 | 41.8 | 8.5 | 450 |
| 6 | None | 5000 | 58.7 | 42.4 | 7.5 | 406 |
| Average of Runs 3, 4, 5, and 6 | | | 58.2 | 42.4 | 8.3 | 437 |
| 7 | 1 wt. % $Sr(OH)_2$ | 5000 | 64.8 | 47.7 | 8.3 | 411 |
| 8 | 1 wt. % $Sr(OH)_2$ | 5000 | 65.0 | 47.7 | 8.2 | 402 |
| Average of Runs 7 and 8 | | | 64.9 | 47.7 | 8.2 | 406 |
| 9 | 5 wt. % $Sr(OH)_2$ | 5000 | 74.3 | 53.3 | 9.3 | 283 |
| 10 | 5 wt. % $Sr(OH)_2$ | 5000 | 74.4 | 53.1 | 9.2 | 291 |
| 11 | 5 wt. % $Sr(OH)_2$ | 5000 | 74.5 | 52.8 | 8.9 | 243 |
| Average of Runs 9, 10, and 11 | | | 74.4 | 53.1 | 9.1 | 272 |
| 12 | 20 wt. % $Sr(OH)_2$ | 5000 | 63.2 | 46.4 | 7.3 | 177 |
| 13 | 20 wt. % $Sr(OH)_2$ | 5000 | 65.6 | 48.3 | 7.8 | 168 |
| Average of Runs 12 and 13 | | | 64.4 | 47.4 | 7.6 | 172 |
| 14 | 1 wt. % $Sr(OH)_2$ + octyl | 5000 | 69.4 | 50.4 | 8.9 | 352 |
| 15 | 1 wt. % $Sr(OH)_2$ + octyl | 5000 | 70.5 | 50.5 | 9.1 | 375 |
| Average of Runs 14 and 15 | | | 70.0 | 50.4 | 9.0 | 364 |
| 16 | 5 wt. % $Sr(OH)_2$ + octyl | 5000 | 77.9 | 56.5 | 8.4 | 202 |
| 17 | 5 wt. % $Sr(OH)_2$ + octyl | 5000 | 77.2 | 55.1 | 9.0 | 193 |
| 18 | 5 wt. % $Sr(OH)_2$ + octyl | 5000 | 76.6 | 53.9 | 8.9 | 188 |
| Average of Runs 16, 17, and 18 | | | 77.2 | 55.2 | 8.8 | 194 |
| 19 | 20 wt. % $Sr(OH)_2$ + octyl | 5000 | 71.8 | 51.6 | 9.0 | 95 |
| 20 | 20 wt. % $Sr(OH)_2$ + octyl | 5000 | 72.8 | 52.3 | 9.2 | 87 |
| Average of Runs 19 and 20 | | | 72.3 | 52.0 | 9.1 | 91 |
| 21 | 5 wt. % $Sr(OH)_2$ + butyl | 5000 | 78.8 | 54.7 | 10.0 | 224 |
| 22 | 5 wt. % $Sr(OH)_2$ + butyl | 5000 | 76.6 | 55.2 | 8.2 | 190 |
| Average of Runs 21 and 22 | | | 77.7 | 55.0 | 9.1 | 207 |

*Standard Cubic Feet per Barrel of Feed

The results reported in Table 1 above show that there is a marked improvement in catalytic activity in the presence of vanadium when alcohol-treated $Sr(OH)_2$ is added to the catalytic cracking compound. Typical of these results is the comparison of the average values obtained from 5 wt.-% $Sr(OH)_2$ additive (Runs 9-11) and the average values obtained from 5 wt.-% $Sr(OH)$-

$_2$+octyl additive (Runs 16-18). Table 1 shows that the octyl alcohol treatment results in an average of a 3.8% increase for conversion and a 4.0% increase for gasoline yield. Additionally, there is a drop in both the coke yield and the hydrogen gas yield. The average drops are 3.3% and 28.7%, respectively. Similar results are obtained when the average values of 5 wt.-% Sr(OH)$_2$ additive (Runs 9-11) are compared with the average values obtained with 5 wt.-% Sr(OH)$_2$+butyl additive (Runs 21 and 22). Table I shows butyl alcohol treatment results in an average increase of 4.4% in conversion, a 3.6% in gasoline yield and a 23.9% increase in hydrogen gas yield. Although the additive of 5 wt.-% Sr(OH)$_2$+butyl did not show an average decrease in coke yield in comparison to 5 wt.-% Sr(OH)$_2$, there was a 10.8 percent decrease in coke yield in comparison to the average of Runs 1 and 2 where no additive or vanadium is present. Additionally, both the 1 wt.-% Sr(OH)$_2$+octyl additive (runs 14 and 15) and the 20 wt.-% Sr(OH)$_2$+octyl additive (runs 19 and 20) show an increase conversion and gasoline yield and a decrease in hydrogen gas yield. In fact, the addition of 20 wt.-% Sr(OH)$_2$+octyl showed the most outstanding increases in conversion and gasoline yield of any of the Sr(OH)$_2$+alcohol additives (12.3% increase in conversion and 9.7 percent increase in gasoline yield when compared with 20 wt.-% Sr(OH)$_2$). 20 wt.-% Sr(OH)$_2$+octyl also showed the least hydrogen gas yield of any of the runs except for runs 1 and 2 where there was no additive or vanadium present. In general, it should be noted that Table 1 demonstrates a general increase in the performance of the catalyst in the presence of vanadium when the Sr(OH)$_2$+alcohol additive is present over the performance of the catalyst with the Sr(OH)$_2$ additive or no additive at all in the presence of vanadium. The present inventions can be clearly seen to satisfy the objectives of reducing the production of hydrogen gas, increasing gasoline yield and increasing the conversion of high boiling point petroleum feedstocks into products of relatively low boiling point.

That which is claimed is:

1. A catalytic cracking composition comprising a physical blend of a cracking catalyst component and alcohol treated Sr(OH)$_2$.

2. A catalytic cracking composition according to claim 1 which comprises from 1 weight percent to 25 weight percent of said alcohol treated Sr(OH)$_2$ based on the total weight of said catalytic cracking composition.

3. A catalytic cracking composition according to claim 1 wherein said alcohol is selected from the group consisting of alcohols with from 2 to 10 carbon atoms and mixtures of any two or more thereof.

4. A catalytic cracking composition according to claim 3 wherein said alcohol is selected from the group consisting of octyl alcohol and butyl alcohol and mixtures thereof.

5. A catalytic cracking composition according to claim 4 which comprises from 1 weight percent to 25 weight percent of said alcohol treated Sr(OH)$_2$ based on the total weight of said catalytic cracking composition.

6. A catalytic cracking composition according to claim 1 wherein said catalyst component comprises a zeolite embedded in an inorganic refractory matrix material.

7. A catalytic cracking composition according to claim 6 wherein said alcohol is selected from the group consisting of alcohols with from 2 to 10 carbon atoms and mixtures of any two or more thereof.

8. A catalytic cracking composition according to claim 7 which comprises from 1 weight percent to 25 weight percent of said alcohol treated Sr(OH)$_2$ based on the total weight of said catalytic cracking composition.

9. A catalytic cracking composition according to claim 7 wherein said alcohol is selected from the group consisting of octyl alcohol and butyl alcohol and mixtures thereof.

10. A catalytic cracking composition according to claim 9 which comprises from 1 weight percent to 25 weight percent of said alcohol treated Sr(OH)$_2$ based on the total weight of said catalytic cracking composition.

11. A catalytic cracking composition according to claim 6 wherein said zeolite is selected from the group consisting of faujasite, chabazite, mordenite, offretite, erionite, zeolite X, zeolite Y, zeolite L, zeolite ZSM and mixtures of any two or more thereof and said inorganic refractory matrix material is selected from the group consisting of silica, alumina, silica-alumina, aluminosilicates, aluminum phosphates and mixtures of any two or more thereof.

12. A catalytic cracking composition according to claim 11 wherein said alcohol is selected from the group consisting of alcohols with from 2 to 10 carbon atoms and mixtures of any two or more thereof.

13. A catalytic cracking composition according to claim 12 which comprises from 1 weight percent to 25 percent of said catalytic cracking composition expressed as said alcohol treated Sr(OH)$_2$ based on the total weight of said catalytic cracking composition.

14. A catalytic cracking composition according to claim 12 wherein said alcohol is selected from the group consisting of octyl alcohol and butyl alcohol and mixtures thereof.

15. A catalytic cracking composition according to claim 14 which comprises from 1 weight percent to 25 weight percent of said alcohol treated Sr(OH)$_2$ based on the total weight of said catalytic cracking composition.

16. A process for preparing a passivation additive comprising:
 (a) mixing Sr(OH)$_2$ with an alcohol to produce an alcohol mixture; and
 (b) calcining said alcohol mixture to form a calcined mixture.

17. A process according to claim 16 in which enough of said alcohol is mixed with said Sr(OH)$_2$ in step (a) to produce said alcohol mixture in the form of a paste.

18. A process according to claim 16 in which said alcohol mixture is calcined in step (b) to a temperature in the range of 400° C. to 600° C.

19. A process according to claim 16 in which said alcohol is selected from the group consisting of alcohols with from 2 to 10 carbon atoms and mixtures of any two or more thereof.

20. A process according to claim 16 in which said alcohol is selected from the group consisting of octyl alcohol and butyl alcohol and mixtures thereof.

21. A process according to claim 16 in which said passivation additive is blended with a cracking catalyst component to form a catalytic cracking composition.

22. A process according to claim 21 in which said cracking catalyst component comprises a zeolite embedded in an organic refractory matrix material.

23. A process according to claim 22 wherein said zeolite is selected from the group consisting of faujasite, chabazite, mordenite, offretite, erionite, zeolite X, zeolite Y, zeolite L, zeolite ZSM and mixtures of any two or more thereof and said inorganic refractory matrix material is selected from the group consisting of silica, alumina, silica-alumina, aluminosilicates, aluminum phosphate, and mixtures of any two or more thereof.

24. A process according to claim 23 wherein:

enough of said alcohol is mixed with said $Sr(OH)_2$ in step (a) to produce said alcohol mixture in the form of a paste;

said alcohol mixture is calcined in step (b) to a temperature in the range of from 400° C. to 600° C.; and, said alcohol is selected from the group consisting of octyl alcohol and butyl alcohol and mixtures thereof.

25. A catalytic cracking composition according to claim 1 wherein the alcohol treated $Sr(OH)_2$ is prepared by a process comprising mixing $Sr(OH)_2$ with an alcohol to produce an alcohol mixture, and calcining said alcohol mixture to form a calcine mixture.

26. A catalytic cracking composition according to claim 25 in which enough of said alcohol is mixed with said $Sr(OH)_2$ to produce said alcohol mixture in the form of a paste.

* * * * *

UNITED STATES PATENT AND TRADEMARK OFFICE
CERTIFICATE OF CORRECTION

PATENT NO. : 5,157,006
DATED : October 20, 1992
INVENTOR(S) : Jesse R. Harris et al It is certified that error appears in the above-identified patent and that said Letters Patent is hereby corrected as shown below:

Column 10, claim 13, line 27 after "25", please insert ---weight---.

Signed and Sealed this

Twenty-ninth Day of March, 1994

Attest:

BRUCE LEHMAN

*Attesting Officer*  *Commissioner of Patents and Trademarks*